July 17, 1951          R. LEE          2,560,728

WAVE ENERGY APPARATUS

Filed April 21, 1945

INVENTOR
ROYAL LEE
BY Christopher L. Waal
ATTORNEY

Patented July 17, 1951

2,560,728

UNITED STATES PATENT OFFICE 2,560,728

WAVE ENERGY APPARATUS

Royal Lee, Elm Grove, Wis., assignor to Lee Foundation for Nutritional Research, Milwaukee, Wis., a corporation of Wisconsin Application April 21, 1945, Serial No. 589,477

5 Claims. (Cl. 99—250)

The present invention relates to a wave energy apparatus, and has for an object to provide an improved apparatus for applying mechanical wave energy to a fluid medium.

Another object is to provide a simple apparatus for producing mechanical vibrations in a liquid, as for the purpose of sterilization or dispersion, or both.

A further object is to provide a simple apparatus for producing vibrations in an elastic fluid, as for sound generation.

The invention further consists in the several features hereinafter described and claimed.

In the accompanying drawing, illustrating certain embodiments of the invention,

Figure 1:
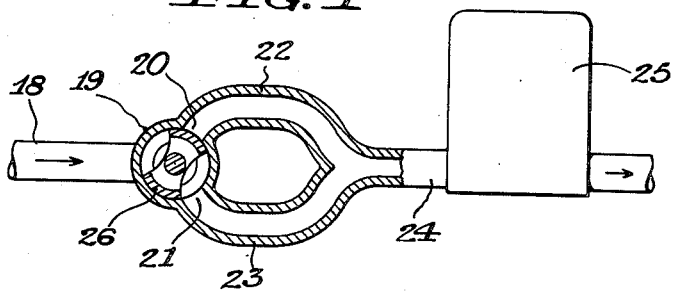
Fig. 1 is a diagrammatic view of an apparatus for applying mechanical wave energy to a liquid, such as a food juice, for the purpose of sterilization or dispersion, or both, parts of the apparatus being shown in section.

The form of apparatus shown in Fig. 1 is adapted for subjecting a juice or other liquid to mechanical wave energy, as for the purpose of sterilization or dispersion, or for both of these treatments. The liquid may be of various types including fruit and vegetable juices, and milk. If desired, the liquid may be first deaerated, as by subjecting it to a vacuum. The liquid may also be concentrated, as by freezing and centrifuging, preferably in a non-oxidizing atmosphere.

For sterilization of a juice destruction of the micro-organisms is effected by mechanical disruption or cavitation incident to the production of mechanical waves or vibrations in the juice. The application of wave energy to the juice may also be used to effect a dispersion or homogenization of the juice.

In the apparatus of Fig. 1, a conduit 18 admits the juice at high pressure and high velocity into a valve chamber 19 having two outlet ports 20 and 21 communicating with the inlet ends of respective conduit sections or branches 22 and 23 which form a loop-shaped conduit the middle portion of which merges into a single outlet conduit 24, the latter discharging into a receiving tank 25 in which a suitable pressure is maintained. A rotary valve 26 mounted in the chamber 19 rotates at a high speed and admits the juice alternately into the inlets of the conduit sections 22 and 23, setting up mechanical waves in these conduit sections to sterilize the juice therein. The wave frequency is preferably relatively high, being in the supersonic or upper audible range. Since there is always communication between the valve chamber and the inlet of at least one of the conduit sections 22 and 23, there is no stoppage of liquid flow in the valve chamber. It will be noted that when one of the ports 20 and 21 is open the other port is closed. The speed of rotation is preferably so selected as to produce a condition of resonance in the loop or path comprising the conduit sections 22 and 23. Under heavy load conditions heat may be generated in the apparatus, but this can be dissipated by the use of water-jacketing (not shown) or by immersing the apparatus in a water bath (not shown).

Figure 2:
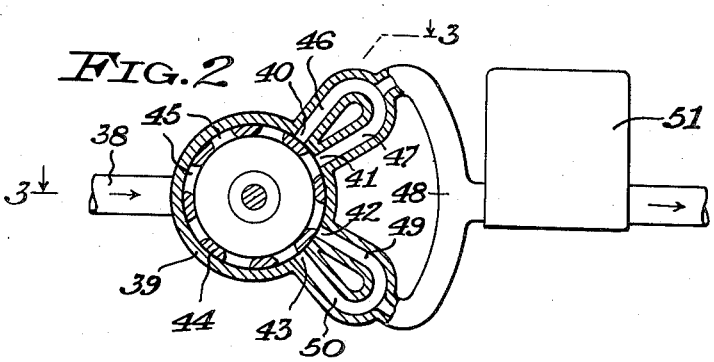
Fig. 2 is a diagrammatic view of a modified form of liquid-treating apparatus.
Figure 3:
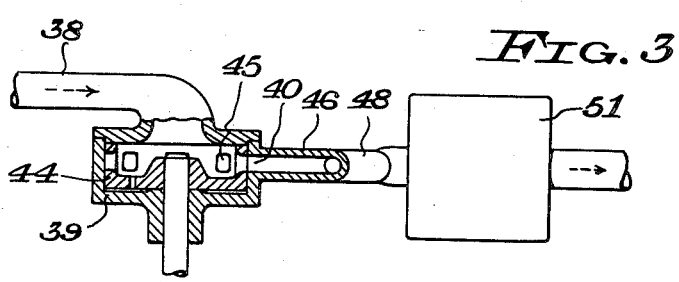
Fig. 3 is a sectional view taken generally along the line 3—3 of Fig. 2.

In the modification shown in Figs. 2 and 3, a conduit 38 admits the juice under pressure into a valve chamber or casing 39 having four angularly spaced outlet ports 40, 41, 42, and 43. A rotary valve 44 having a plurality of equally spaced peripheral ports 45, eight being shown by way of example, rotates at a high speed within the casing 39 and admits the juice into the outlet ports 40, 41, 42, and 43. The casing ports 40 and 41 are so spaced that when one is fully closed the other is fully open, and the ports 42 and 43 are similarly related. By way of example, the two ports of each set are spaced 45°. The ports 40 and 41 are connected to the inlets of respective conduit sections or branches 46 and 47, the outer ends of which communicate with one end of a header 48, and the ports 42 and 43 are connected to the inlets of respective conduit sections or branches 49 and 50, the outer ends of which communicate with the other end of the header 48. Each pair of the conduit sections form a conduit, here shown to be loop-shaped, the middle portion of the conduit being connected to the header. The two sets of casing ports are so arranged that the cycles of operation are 90° out of phase. An intermediate portion of the header is connected to a receiving tank 51. The operation of the apparatus of Figs. 2 and 3 is generally similar to that of Fig. 1, the rotation of the valve causing mechanical waves to be set up in the liquid in the connected conduit sections 46 and 47 and in the liquid in the connected conduit sections 49 and 50, so as to treat the liquid.

Figure 4:
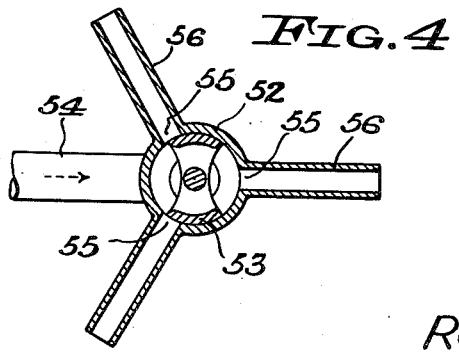
Fig. 4 is a diagrammatic view of another modified form of apparatus, arranged as a sound generator.

The modification of Fig. 4 is adapted to form a sound generator, and has a ported valve chamber or casing 52 and a rotary valve 53 generally similar to the corresponding parts of the apparatus of Figs. 1 and 2, the chamber being adapted to receive compressed air or other gaseous medium from a pipe 54. By way of example, the casing has three equally spaced peripheral ports 55 connected to open-ended radiating pipes or conduits 56, and the rotary valve has two diametrically opposite valve segments. At least one of the three ports 55 is in connection with the valve casing at all times, and the flow of air through the casing is continuous, permitting efficient operation. Pulses of air are discharged in succession through the casing ports, and for optimum operation the speed of rotation of the valve 53 and length of the conduits 56 are suitably correlated to obtain a condition of resonance.

This application constitutes a continuation-in-part of my application for Preservation of Liquid Foods, Serial No. 343,847, filed July 3, 1940, now Patent No. 2,374,219, issued April 24, 1945.

What I claim as new and desire to secure by Letters Patent is:

1. Wave energy apparatus, comprising a source of compressed liquid, a casing communicating with said source and having a plurality of pairs of outlet ports, a plurality of conduits each having opposite ends connected to a pair of said casing ports, each conduit having an outlet at an intermediate portion, and cyclically operated rotary valve means for opening and closing said ports for setting up waves in said conduits, one of the ports of each pair being open while the other is closed, and said pairs of ports being arranged in out-of-phase relation.

2. Wave energy apparatus for treating a liquid, comprising a conduit having a pair of spaced inlets and an outlet at a point intermediate said inlets, a source of liquid under pressure connected to said inlets, and cyclically operating valve means cooperating with said inlets to control the admission of liquid thereto, said valve means being alternately in open and closed position with respect to each inlet and being in open position with respect to one of said inlets while in closed position with respect to the other inlet for admitting wave-forming pulses of compressed liquid alternately into said inlets.

3. Wave energy apparatus, comprising a source of compressed fluid, a conduit having fluid inlets at opposite ends communicating with said source and further having an outlet at an intermediate point, and cyclically operating valve means cooperating with said inlets to control the admission of fluid thereto from said source, said valve means being alternately in open and closed position with respect to each inlet and being in open position with respect to one of said inlets while in closed position with respect to the other inlet for admitting wave-forming pulses of compressed fluid alternately into said inlets.

4. Wave energy apparatus for treating a liquid, comprising a source of liquid under pressure, a conduit having inlets at opposite ends communicating with said source and further having an intermediate outlet, cyclically operating valve means cooperating with said inlets to control the admission of liquid thereto, said valve means being alternately in open and closed position with respect to each inlet and being in open position with respect to one of said inlets while in closed position with respect to the other inlet for admitting wave-forming pulses of compressed liquid alternately into said inlets, and means for establishing a back pressure at said outlet.

5. Wave energy apparatus, comprising a source of compressed fluid, a resonating conduit having a pair of spaced inlets and an outlet intermediate said inlets, and cyclically operating fluid-admitting valve means cooperating with said inlets, said valve means being alternately in open and closed position with respect to each inlet and being in open position with respect to one of said inlets while in closed position with respect to the other inlet for admitting wave-forming pulses of compressed fluid alternately into said inlets.

ROYAL LEE.

REFERENCES CITED

The following references are of record in the file of this patent:

UNITED STATES PATENTS

| Number | Name | Date |
|---|---|---|
| 699,405 | Newhouse | May 6, 1902 |
| 2,138,839 | Chambers | Dec. 6, 1938 |
| 2,163,650 | Weaver | June 27, 1939 |
| 2,258,630 | Smith | Oct. 14, 1941 |
| 2,328,581 | Quinn | Sept. 7, 1943 |

FOREIGN PATENTS

| Number | Country | Date |
|---|---|---|
| 7,499 | Great Britain | Mar. 27, 1912 |
| 28,022 | Great Britain | Jan. 28, 1904 |
| 737,562 | France | Dec. 13, 1932 |

Certificate of Correction

Patent No. 2,560,728 July 17, 1951

ROYAL LEE

It is hereby certified that error appears in the printed specification of the above numbered patent requiring correction as follows:

Column 3, line 32, for "operated" read *operating*;

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*